United States Patent Office 3,002,098
Patented Sept. 26, 1961

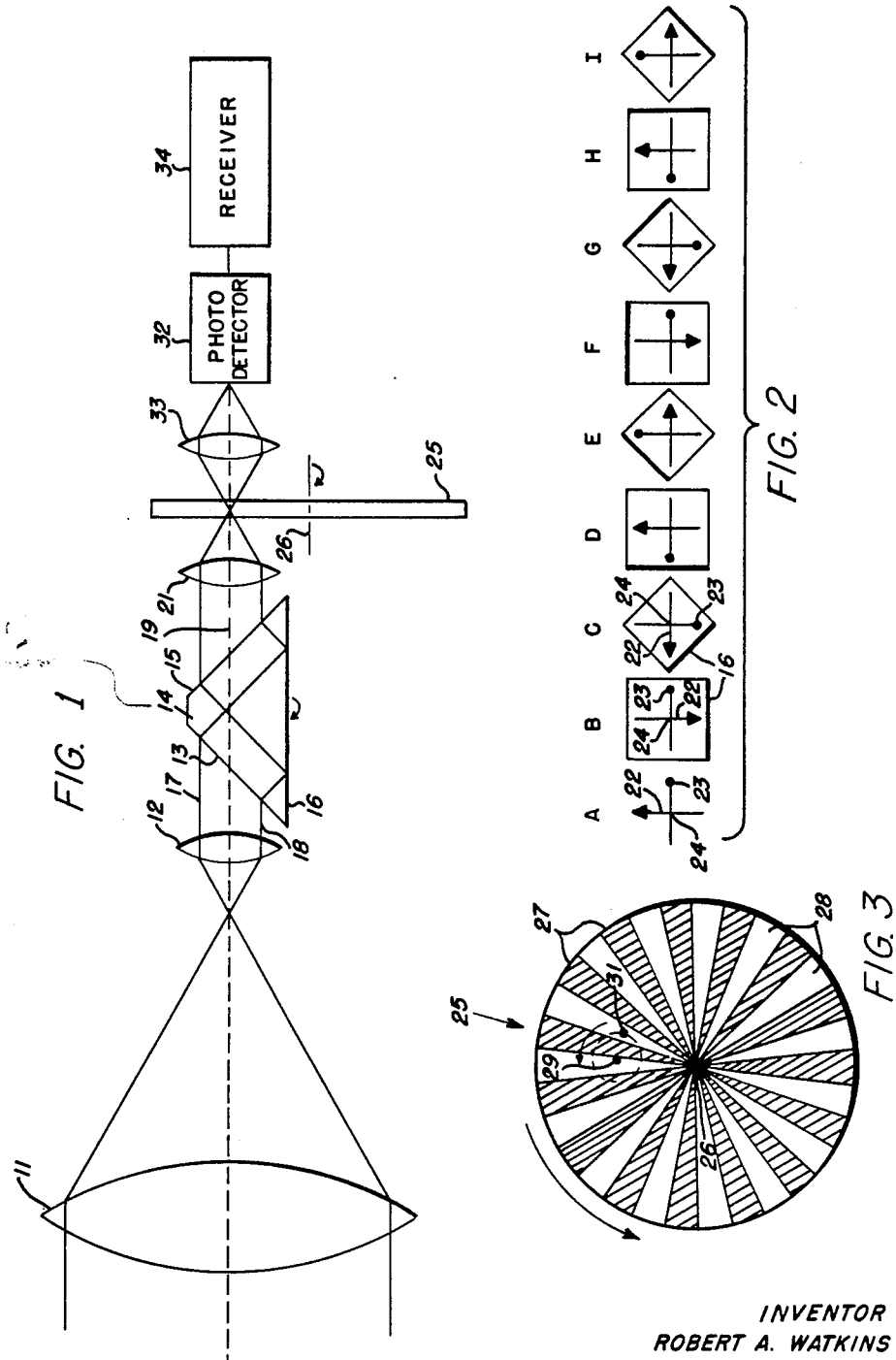

3,002,098
RETICLE SYSTEM FOR OPTICAL
GUIDANCE SYSTEMS
Robert A. Watkins, Santa Barbara, Calif., assignor to
Raytheon Company, a corporation of Delaware
Filed Mar. 12, 1959, Ser. No. 799,046
7 Claims. (Cl. 250—203)

The present invention pertains to guidance systems and more particularly to reticle systems forming a part of optical guidance systems for controlling the direction of travel of dirigible bodies.

FM reticle systems commonly used in guidance systems for guiding trackers and the like may be described as comprised of two major components. The first of these is an optical system for producing and rotating an image of certain targets about a fixed point and the second major component is a fixed reticle for converting the continuously rotating optical image of a target to a discontinuous image having a fixed frequency when the target is on the longitudinal axis of the tracker. The reticle obstructs or chops the optical image of a target as the image is rotated and produces an optical signal having an unmodulated fundamental frequency when a target is located on the longitudinal axis of the tracker and frequency modulation of this fundamental frequency when a target is located off the longitudinal axis of the tracker. Control means well known in the art are actuated by this optical signal to maintain the target on the longitudinal axis of the tracker and hence maintain a collision course.

A reticle consists, basically, of a plurality of transparent and opaque portions arranged, for example, in the form of spokes. In operation, prior art optical systems, cause the image of a suitable point source target located on the longitudinal axis of the tracker to travel in a circle concentric about the axis of the reticle while the image of an off-axis target travels a circle of the same size but which is no longer concentric. The optical system referred to hereinabove may be comprised of an objective lens and a prism having the form of a parallelogram. This arrangement, for example, may result in a field of 5° together with a 2½° tracking field which combines to expose the system to all points within a 10° field at some time during a single rotation of the prism. Obviously the total field to which the system is exposed and that can undesirably influence the system is substantially greater than the tracking field, which preferably is the total field to which the system should be exposed.

In the present invention the center of image rotation and the center of the tracking field are made to coincide whereby the image of an axial target is made to always fall at a fixed point while the image of an off-axis target is made to travel a circle the diameter of which is proportional to target angle and wherein the instantaneous position of the off-axis image is proportional to target orientation angle. As used herein, target angle defines the degree or angle that a target is offset from a point on the longitudinal axis of the tracker, and orientation angle defines the position of the target about the longitudinal axis of the tracker from a fixed reference point such as a point perpendicular to the longitudinal axis. The aforementioned change in principle of operation is obtained by rotating an optical component which has the property of rotating an image about an axis common to the rotational axis of the component, offsetting the reticle from the axis of rotation and simultaneously rotating the reticle with respect to the optical component. A system having the characteristics described hereinabove is not subject to exposure to a field undesirably greater than the desired tracking field, as is prior art systems, hence if the instantaneous field of view to which the system is exposed is, for example, the same 5° field of prior art systems, then only targets within ±2½° of the optical axis will have any effect on the system. In prior art systems of the type referred to hereinbefore by way of example, targets within ±5° can have an effect on the system and cause the tracker to home on undesirable targets or be decoyed away from an intended target.

Other objects and many of the attendant advantages of the invention will be readily appreciated as the same becomes better understood by reference to the following detailed description when considered in connection with the accompanying drawing wherein:

FIG. 1 is a sectional diagrammatical representation of the invention;

FIGS. 2A through 2I show the relation of an image seen through a Dove prism when rotated as compared to the image seen without benefit of the prism; and FIG. 3 is a front view of the reticle and shows the relation of on-axis and off-axis target images incident on the reticle in accordance with the invention.

With reference now to FIG. 1, there is shown an optical system comprised of an objective lens 11 for producing an image of space forwardly of the tracker and a condenser lens 12 for reducing this image to a size less than that of the front nonparallel surface 13 of a prism 14 having a trapezoidal cross-section. Lens 12 refracts light rays in either the visible or infrared spectrum that form the image whereby they are rendered parallel when they are incident on surface 13 of the prism 14. The prism 14 is preferably a Dove prism rotatable about its optical axis 19 as by a conventional ball and race arrangement driven by a suitable motor (not shown) which form a conventional and straightforward mechanical support and drive system. As may be readily seen by reference to FIG. 1, rays incident on the prism 14 are refracted at surfaces 13 and 15 and reflected at surface 16 whereby the orientation of the image is rotated about axis 19 and reversed upon passing through the prism 14. Upon emerging from the prism the position of the uppermost and lowermost rays 17—18 are reversed and rays lying between rays 17—18 will behave in exactly the same manner, with the sole exception that a ray or rays lying on the optical axis 19 of the prism 14 will not be affected. Since the cross section of the prism 14 is constant in all planes parallel to the paper containing FIG. 1, the effect of the prism 14, when rotated and viewed from the rear of the prism, as at lens 21, is shown by way of example in FIGS. 2A through 2I. For the purposes of illustration the arrows 22 represent a single image, the ball 23 is provided for purposes of illustration to show orientation of the image during rotation and the heavy line represents the reflecting surface 16 of the prism 14. FIG. 2A illustrates an image 22 as it would appear forwardly of the prism 14 and FIGS. 2B through 2I illustrate the image 22 as it would be seen through the prism 14 for various positions of the prism 14 as it is rotated. As may now be clearly apparent, an image seen through the prism 14 rotates at twice the speed of mechanical rotation of the prism and the central or axial point 24 remains fixed.

The condenser lens 21 concentric about the optical axis 19 focuses the rays transmitted by the prism 14 on a circular reticle 25 rotatable about an axis 26 offset from the optical axis 19. With reference now to FIG. 3, the reticle 25 may, for example, be formed of respectively alternate opaque and transparent portions 27—28 as shown, radial to the axis 26. For the simplest case where the optical axis 19 is coincident with the longitudinal axis of the tracker, a suitable point source target on the longitudinal axis of the tracker will appear as an unmoving spot 29 on the reticle 25 and will not be displaced. A target within the tracking field and off the longitudinal axis will, for example, appear as a spot 31 on the reticle 25, but the image of such a target will rotate concentrically about point 29, first with and then against the direction of rotation of the reticle as shown in FIG. 3.

Since the width of the opaque and transparent portions 27—28 of the reticle decreases as the axis of rotation 26 of the reticle 25 is approached, more spokes will be passed per unit of time when the image of an off-axis target is near the axis of rotation 26 of the reticle than when it is furthest distant. The prism 14 does not cause rotation or motion of an axial image, hence for the case of a target located on the longitudinal axis of the tracker the reticle 25 produces an intermittent optical signal having a fixed and fundamental frequency dependent on the speed of rotation of the reticle 25. For the case of an off-axis target, an intermittent optical signal is produced in the same manner by the reticle 25, but due to the simultaneous rotation of the image 31 of an off-axis target about spot 29, or to say it another way, the optical axis 19 of the prism, the fundamental frequency referred to immediately hereinabove is frequency modulated, the phase of the modulation being proportional to target orientation angle and the magnitude of the modulation being proportional to target angle.

With reference now to FIG. 1, the intermittent optical signal produced by the reticle 25 is converted to a more convenient electrical signal by means of a suitable photo detector 32 and a condenser lens 33 disposed between the reticle 25 and the photo detector 32 and adapted to effectively focus either target image 29—31 on the photo detector 32. The output of the photo detector 32, a constant frequency electrical signal for an axial target and a frequency modulated signal for an off-axis target, is then supplied to a receiver 34 comprised of conventional electronic and mechanical components well known in the art for effecting control of the tracker to obtain and maintain a collision course with an axial target.

The invention provides a new and novel principle of operation of reticle systems which reduces the field of effect to the field of interest whereby a guidance system incorporating the invention is substantially less susceptible to jamming or other effects which tend to decrease accuracy.

While the present invention has been described in its preferred embodiment, it is realized that modifications may be made, and it is desired that it be understood that no limitations on the invention are intended other than may be imposed by the scope of the appended claims.

What is claimed is:

1. In a reticle system the combination comprising: first means for receiving and transmitting an optical image and effecting rotation of any portion of said image located off the optical axis of said first means; second means for supplying to said first means an optical image of space forwardly of said body; third means rotatable about an axis offset from said optical axis and having opaque and transparent portions whereby rays originating from said first means and incident on said third means is periodically obstructed as said third means rotates; fourth means for receiving an image transmitted by said first means and focusing said image as a spot on said third means; and a photo detector operative from light transmitted by said third means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

2. In a reticle system the combination comprising: first means including an optical axis for receiving and transmitting an optical image and effecting continuous rotation of any portion of said image located off the optical axis of said first means; second means for supplying to said first means an optical image of space forwardly of and adjacent to the longitudinal axis of the body; third means rotatable about an axis offset from said optical axis and having opaque and transparent portions arranged and disposed whereby light originating from said first means is incident on said opaque and transparent portions and is periodically obstructed as said third means rotates; fourth means for receiving an image transmitted by said first means and focusing said image as a spot on said third means; and a photo detector operative from light transmitted by said third means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

3. In a guidance system for dirigible bodies the combination comprising: first means having an optical axis for receiving and transmitting an optical image and effecting continuous rotation of said image about said optical axis; second means for supplying to said first means an optical image of targets forwardly of and adjacent to the longitudinal axis of said body; third means rotatable about an axis offset from said optical axis and having opaque and transparent portions whereby a target image from said first means is incident on said opaque and transparent portions and is periodically obstructed as said third means rotates; fourth means for receiving a target image transmitted by said first means and focusing said image as a spot on said third means whereby a target located along the said longitudinal axis appears as a spot at a fixed location on said third means and a target located off said longitudinal axis appears as a spot on said third means and moves around said fixed location; and a photo detector operative from a target image transmitted by said third means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

4. In a guidance system for dirigible bodies the combination comprising: first means including a prism having a trapezoidal cross section and an optical axis passing through the non-parallel sides of said prism for receiving and transmitting an optical image and effecting continuous rotation of said image about said optical axis; second means for supplying an optical image of space forwardly of and adjacent to the longitudinal axis of the body to a non-parallel side of said prism; third means rotatable about an axis offset from said optical axis and having opaque and transparent portions arranged and disposed whereby rays originating from said first means is incident on said opaque and transparent portions and is periodically obstructed as said third means rotates; fourth means for receiving an image transmitted by said first means and focusing said image as a spot on said third means; and a photo detector operative from light transmitted by said third means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

5. In a guidance system for dirigible bodies the combination comprising: first means including a prism having a trapezoidal cross section and an optical axis passing through the non-parallel sides of said prism for receiving and transmitting an optical image and effecting continuous rotation of said image about said optical axis; second means for supplying an optical image of targets forwardly of and adjacent to the longitudinal axis of the body to a non-parallel side of said prism; third means rotatable about an axis offset from said optical axis and having opaque and transparent portions arranged and disposed whereby a target image from said first means is incident on said opaque and transparent portions and is periodically obstructed as said third means rotates; fourth means for receiving a target image transmitted by said first means and focusing said image as a spot on said third means whereby a target located along the said longitudinal axis appears as a spot at a fixed location on said third means and a target located off said longitudinal axis appears as a spot on said third means and moves around said fixed location; and a photo detector operative from a target image transmitted by said third means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

6. In a guidance system for dirigible bodies the combination comprising: first means including a prism having a trapezoidal cross section and an optical axis passing through the non-parallel sides of said prism for receiving and transmitting an optical image and effecting continuous rotation of said image about said optical axis; an objective lens and condenser lens arranged and adapted to supply an optical image of targets forwardly of and adjacent to the longitudinal axis of said body to a non-parallel side of said prism; second means rotatable about an axis offset from said optical axis and having opaque and transparent portions arranged and disposed whereby a target image from said prism will be incident on said opaque and transparent portions and periodically obstructed as said third means rotates; a condenser lens disposed between said prism and said second means for receiving a target image transmitted by said prism and focusing said target image as a spot on said second means; and a photo detector operative from light transmitted by said second means whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

7. In a target tracking system for guiding a dirigible body the combination comprising: a Dove prism having a trapezoidal cross section and an optical axis passing through the non-parallel sides of said prism and substantially parallel to the parallel sides of said prism for receiving and transmitting an optical image, said prism being rotatable about said optical axis; means for rotating said prism whereby an image transmitted by said prism and not on said optical axis is continuously rotated about said optical axis; an optical system arranged and adapted to supply an optical image of targets forwardly of and adjacent to the longitudinal axis of said body to a non-parallel side of said prism; a reticle rotatable about an axis offset from said optical axis having opaque and transparent portions arranged and disposed whereby a target image from said prism will be incident on said opaque and transparent portions; means for rotating said reticle at a fixed rate whereby a target image incident on said reticle is first obstructed and then transmitted through said reticle; a condenser lens for receiving a target image transmitted by said prism and focusing said image as a spot on said reticle whereby a target located along the said longitudinal axis appears as a spot at a fixed location on said reticle and a target located off said longitudinal axis appears as a spot on said reticle and moves concentrically around said fixed location; and a photo detector operative from a target image transmitted by said reticle whereby the image of a target on the longitudinal axis of said body produces a constant frequency output signal from said photo detector and a target off the longitudinal axis of said body produces a deviation from said constant frequency the phase of which is proportional to target orientation angle and the magnitude of which is proportional to target angle.

References Cited in the file of this patent

UNITED STATES PATENTS

| | | |
|---|---|---|
| 2,425,541 | Konet | Aug. 12, 1947 |
| 2,447,344 | Kliever | Aug. 17, 1948 |
| 2,513,367 | Scott | July 4, 1950 |
| 2,659,828 | Eliott | Nov. 17, 1953 |